United States Patent
Yamazaki et al.

(10) Patent No.: US 6,902,383 B2
(45) Date of Patent: Jun. 7, 2005

(54) APPARATUS CONTAINING COOLING AND WARMING DEVICES FOR THE PREPARATION OF A POLYMER SOLUTION

(75) Inventors: Hidekazu Yamazaki, Kanagawa (JP); Tadahiro Tsujimoto, Kanagawa (JP); Yukihiro Katai, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 168 days.

(21) Appl. No.: 09/984,132

(22) Filed: Oct. 29, 2001

(65) Prior Publication Data

US 2002/0044986 A1 Apr. 18, 2002

Related U.S. Application Data

(62) Division of application No. 09/087,927, filed on Jun. 1, 1998, now Pat. No. 6,367,960, which is a division of application No. 08/759,638, filed on Dec. 5, 1996, now Pat. No. 5,783,121.

(30) Foreign Application Priority Data

Dec. 5, 1995 (JP) .............................. 7-344614
Jul. 30, 1996 (JP) .............................. 8-216769

(51) Int. Cl.$^7$ ............................................. B01F 15/06
(52) U.S. Cl. ......................... 425/68; 425/67; 425/378.1; 425/378.2; 425/379.1
(58) Field of Search .............................. 425/67, 68, 71, 425/197, 198, 378.1, 378.2, 379.1, 66, 70; 422/134; 99/353, 470; 366/14, 15, 20, 38, 50, 144, 149, 186, 290, 291

(56) References Cited

U.S. PATENT DOCUMENTS

| | | | |
|---|---|---|---|
| 778,558 A | 12/1904 | Truxal | 366/149 |
| 1,422,102 A | 7/1922 | Hutchinson | 426/622 |
| 1,735,393 A | 11/1929 | Hiller | 241/66 |
| 1,766,033 A | 6/1930 | Meakin | 422/273 |
| 2,032,201 A | 2/1936 | Davis et al. | 366/149 |
| 2,081,171 A * | 5/1937 | Dreyfus | 264/208 |
| 2,494,891 A | 1/1950 | Marshall | 510/145 |
| 2,541,113 A | 2/1951 | Smith, Jr. et al. | 426/401 |
| 2,670,937 A | 3/1954 | Truesdell | 366/149 |
| 2,723,900 A * | 11/1955 | Hooper | 264/37.21 |
| 2,955,017 A * | 10/1960 | Boyer | 264/180 |
| 3,073,733 A * | 1/1963 | Mitchell | 428/212 |
| 3,199,795 A | 8/1965 | Bennett et al. | 366/331 |
| 3,726,648 A | 4/1973 | Weber et al. | 422/134 |
| 3,756,518 A | 9/1973 | Bailey | 241/65 |
| 3,836,336 A | 9/1974 | Yasui et al. | 422/134 |
| 3,887,169 A | 6/1975 | Maynard | 366/307 |
| 3,944,534 A | 3/1976 | Sennari et al. | 526/64 |
| 3,963,558 A | 6/1976 | Skidmore | 159/2.2 |
| 4,363,784 A | 12/1982 | Hilbig et al. | 422/134 |
| 4,424,301 A | 1/1984 | Klippert et al. | 525/53 |
| RE32,159 E | 5/1986 | Davis | 366/279 |
| 4,661,321 A | 4/1987 | Byrd et al. | 422/111 |
| 4,878,677 A | 11/1989 | Larkins et al. | 277/511 |
| 5,120,559 A | 6/1992 | Rizvi et al. | 426/446 |
| 5,356,208 A | 10/1994 | Tadmor | 366/79 |
| 5,735,603 A | 4/1998 | Kesig et al. | 366/331 |
| 5,823,673 A | 10/1998 | Muntener | 366/303 |

FOREIGN PATENT DOCUMENTS

EP 0723993 A1 7/1996

OTHER PUBLICATIONS

Cowie et al., *Die Makromolekulare Chemie*, 143, pp. 105–114 (1971).
Kamide et al., *Textile Machinery Society*, 34, pp. 57–61 (1981) (excerpt translation).

* cited by examiner

Primary Examiner—Joseph S. Del Sole
(74) Attorney, Agent, or Firm—Birch, Stewart, Kolasch & Birch, LLP

(57) ABSTRACT

A novel apparatus for the preparation of a polymer solution includes a stirring device, an extruder connected to the stirring device, a cooling device connected to the extruder, and a warming device connected to the cooling device. The extruder is a fiber or membrane extruding die. Both the cooling device and warming device are vessels.

14 Claims, 4 Drawing Sheets

APPARATUS CONTAINING COOLING AND WARMING DEVICES FOR THE PREPARATION OF A POLYMER SOLUTION

This application is a divisional of application Ser. No. 09/087,927, filed on Jun. 1, 1998, and issued as U.S. Pat. No. 6,367,960, which is a divisional application of application Ser. No. 08/759,638, filed on Dec. 5, 1996 and issued as U.S. Pat. No. 5,783,121, the entire contents of which are hereby incorporated by reference and for which priority is claimed under 35 U.S.C. § 120; and this application claims priority of Application Nos. 7-344614 and 8-216769 filed in Japan on Dec. 5, 1995 and Jul. 30, 1996, respectively, under 35 U.S.C. § 119.

FIELD OF THE INVENTION

The present invention relates to a process and an apparatus for the preparation of a polymer solution.

BACKGROUND OF THE INVENTION

Polymers have been used in various technical fields. A polymer material such as a plastic film is formed by using a melt or solution of a polymer. A process of forming a polymer material comprises dissolving a polymer in a solvent to form a solution, forming a polymer material by using the solution, and drying the formed material by evaporating the solvent.

The solvent of a polymer is a liquid that can dissolve a polymer at a required concentration. The solvent also requires safety and an appropriate boiling point for evaporating the solvent from a formed polymer material. Recently, the solvent particularly requires safety of the human body and the environment. Therefore, it is now rather difficult to find an appropriate solvent in liquids that can dissolve a polymer.

For example, methylene chloride has been used as a solvent for cellulose triacetate. However, the use of hydrocarbon halides such as methylene chloride has recently been severely restricted to protect global environmental conditions. Further, methylene chloride may cause problems in the workplace environment.

On the other hand, acetone is a widely used organic solvent. Acetone has an appropriate boiling point (56° C.). Further, acetone has few adverse reactions with the human body and on global environmental conditions, compared with the other organic solvents. However, cellulose triacetate has poor solubility in acetone. Cellulose triacetate can swell in acetone, but scarcely dissolves in acetone.

J. M. G. Cowie et al. report in Makromol., Chem., 143 (1971) 105–114, that cellulose acetate having a substitution degree in the range of 2.70 (acetic acid content: 60.1%) to 2.80 (acetic acid content: 61.3%) is dissolved in acetone by a specific process. The process comprises the steps of cooling the cellulose acetate in acetone to a temperature of −80 to −70° C., and warming it to obtain 0.5 to 5 wt. % solution of the cellulose acetate in acetone. The method of cooling a mixture of a polymer and a solvent to obtain a solution is hereinafter referred to as a cooling dissolution method.

The solution of cellulose acetate in acetone is also reported by K. Kamide et al., Textile Machinery Society, Vol. 34, 57–61 (1981). The report (written in Japanese) is entitled "Dry spinning process using acetone solution of triacetyl cellulose." In the report, the cooling dissolution method is applied to the art of fiber spinning. The experiments shown in the report examine the mechanical strength, the dyeing property and the cross sectional profile of the fiber obtained by the cooling dissolution method. In the report, 10 to 25 wt. % solution of cellulose acetate is used to form a fiber.

SUMMARY OF THE INVENTION

An object of the present invention is to dissolve a polymer in a solvent according to an improved cooling dissolution method, even if the polymer is swelled in, but is not dissolved in the solvent by a conventional dissolution method.

Another object of the invention is to provide an apparatus that can be advantageously used in a cooling dissolution method.

The present invention provides a process for the preparation of a polymer solution which comprises the steps of: mixing a polymer with a solvent to swell the polymer in the solvent; cooling the swelled mixture to a temperature of −100 to −10° C. at a rate of faster than 1° C. per minute; and then warming the cooled mixture to a temperature of 0 to 120° C. to dissolve the polymer in the solvent.

The present invention also provides a process for the preparation of a polymer solution which comprises the steps of: mixing a polymer with a solvent to swell the polymer in the solvent; cooling the swelled mixture to a temperature of −100 to −10° C.; and then warming the cooled mixture to a temperature of 0 to 120° C. at a rate of faster than 1° C. per minute to dissolve the polymer in the solvent.

The invention further provides an apparatus for the preparation of a polymer solution which comprises a stirring device, a cooling device connected to the stirring device, and a warming device connected to the cooling device, wherein both of the cooling device and the warming device include a rotary screw.

The invention furthermore provides an apparatus for the preparation of a polymer solution which comprises a stirring device, an extrusion device connected to the stirring device, a cooling device connected to the extrusion device and a warming device connected to the cooling device, wherein the extrusion device is a fiber or membrane extruding die, and both of the cooling device and the warming device mainly consist of a vessel.

A polymer can be dissolved in a solvent by a cooling dissolution method, even if the polymer is not dissolved in the solvent by a conventional dissolution method. It has been considered that the effect of the cooling dissolution method is obtained by a change of a molecular structure of a polymer molecule (e.g., destruction of an ordered structure of the molecule), which is caused by cooling and warming the polymer.

The present inventors have studied the cooling dissolution method, and have found that a polymer can more easily be dissolved in a solvent by cooling or warming the polymer quickly after swelling the polymer in the solvent. The inventors consider that a molecular structure of a polymer molecule is greatly changed by cooling or warming the polymer quickly (preferably cooling and warming the polymer quickly).

J. M. G. Cowie et al. are silent with respect to the cooling rate and the warming rate, except that acetone solutions of cellulose acetate are cooled to about 240° K and allowed to warm up at a rate of approximately 0.2° per minute at a preliminary experiment of J. M. G. Cowie et al. K. Kamide et al. describe that the polymer cooled at −70° C. is warmed to 50° C. for 5 hours. Accordingly, the warming rate described in K. Kamide et al. is 0.4° C. per minute. The cooling rate (which is not described in J. M. G. Cowie et al. and K. Kamide et al.) is supposed to be analogous to the warming rate.

In the process of the present invention, the swelled mixture is cooled at a rate of faster than 1° C. per minute or the cooled mixture is warmed at a rate of faster than 1° C. per minute. According to the process of the invention, a polymer solution can be made from various combinations of polymers and solvents. Accordingly, the number of solvents that can dissolve a polymer is increased by the present invention. Therefore, an appropriate solvent can be selected from many liquids that dissolve a polymer according to the process of the invention.

The process of the invention can be advantageously conducted by using an apparatus of the present invention, which can quickly cool or warm a mixture of a polymer and a solvent. The apparatus of the invention has another advantage of an excellent thermal efficiency.

DETAILED DESCRIPTION OF THE INVENTION

[Polymer and Solvent]

Figure 1:
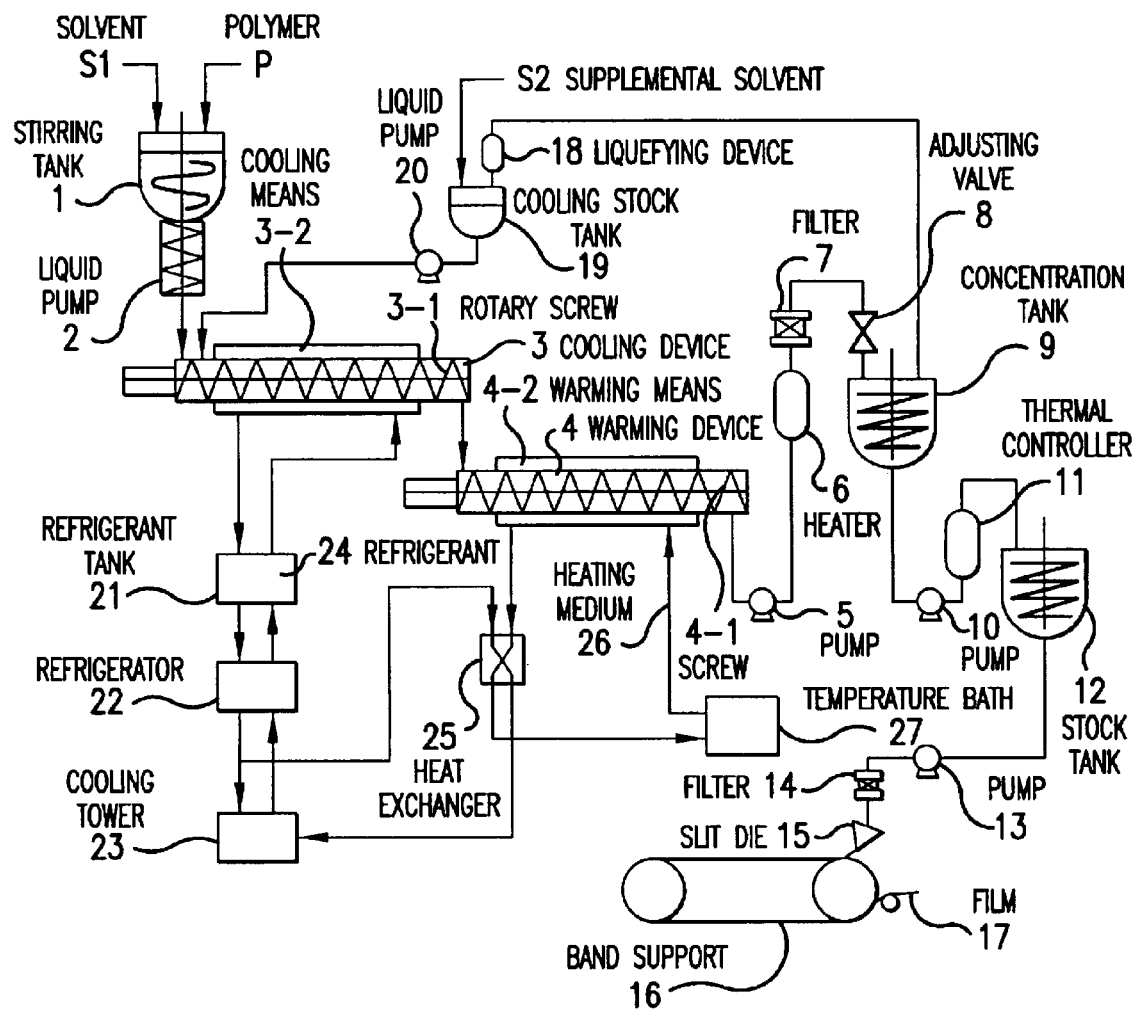
FIG. 1 is a flow chart schematically illustrating the process and apparatus of the first embodiment.

A combination of a polymer and a solvent is selected preferably for a condition that the polymer swells in the solvent at a temperature of 0 to 120° C., and preferably 0 to 55° C. (more preferably, a temperature at which the obtained solution will be used). If a polymer does not swell in a solvent, it is substantially impossible to dissolve the polymer in the solvent even if a cooling dissolution method is used. Even though a polymer is dissolved in a solvent at room temperature, the present invention is effective because the process of the invention can dissolve the polymer in the solvent faster than a conventional dissolution method such as a method of stirring a mixture of the polymer and the solvent at a room temperature or an elevated temperature.

Examples of the polymers include polyamides, polyolefins (e.g., a norbornene polymer), polystyrenes, polycarbonates, polysulfones, polyacrylic polymers, polymethacrylic polymers (e.g., polymethyl methacrylate), polyetheretherketones, polyvinyl alcohols, polyvinyl acetates and cellulose derivatives (e.g., a cellulose ester of a lower fatty acid).

The present invention is particularly effective in dissolving a cellulose ester of a lower fatty acid in a solvent.

The lower fatty acid of the cellulose ester means a fatty acid having 1 to 6 carbon atoms. The number of the carbon atoms preferably is 2 (cellulose acetate), 3 (cellulose propionate) or 4 (cellulose butyrate). Cellulose acetate is more preferred, and cellulose triacetate (average acetic acid content: 58.0 to 62.5%) is particularly preferred. The invention is also effective in dissolving a cellulose ester of two or more fatty acids, such as cellulose acetate propionate and cellulose acetate butyrate.

In the present invention, an organic solvent is preferred to an inorganic solvent. Examples of the organic solvents include ketones (e.g., acetone, methyl ethyl ketone, cyclohexanone), esters (e.g., methyl formate, methyl acetate, ethyl acetate, amyl acetate, butyl acetate), ethers (e.g., dioxane, dioxolane, THF, diethyl ether, methyl t-butyl ether), hydrocarbons (e.g., benzene, toluene, xylene, hexane) and alcohols (e.g., methanol, ethanol).

A polymer is preferably swelled in a solvent, as is mentioned above. Accordingly, the solvent should be determined depending on the polymer. For example, preferred solvents of cellulose triacetate, polycarbonates and polystyrenes include acetone and methyl acetate. Preferred solvents of a norbornene polymer include benzene, toluene, xylene, hexane, acetone and methyl ethyl ketone. Preferred solvents of polymethyl methacrylate include acetone, methyl ethyl ketone, methyl acetate, butyl acetate and methanol. Two or more solvents can be used in combination.

The solvent has a boiling point preferably in the range of 20 to 300° C., more preferably in the range of 30 to 200° C., and most preferably in the range of 40 to 100° C.

[Swelling Stage]

At the first stage, a polymer is mixed with a solvent to swell the polymer in the solvent. The swelling stage is preferably conducted at a temperature of −10 to 55° C. The swelling stage is usually conducted at room temperature.

The ratio of the polymer to the mixture is determined depending on a concentration of a solution to be obtained. In the case that a solvent is supplied to the mixture at a cooling stage (described below), the amount of the solvent in the mixture should be determined by subtracting the amount of the supplemental solvent from the amount of the solvent in a solution to be obtained. The amount of the polymer in the solution to be obtained is preferably in the range of 5 to 30 wt. %, more preferably in the range of 8 to 20 wt. %, and most preferably in the range of 10 to 15 wt. %.

The mixture of the polymer and the solvent is preferably stirred to swell the polymer in the solvent. The stirring time is preferably in the range of 10 to 150 minutes, and more preferably in the range of 20 to 120 minutes.

At the swelling stage, other optional additives such as a plasticizer, a deterioration inhibitor, a dye and an ultraviolet absorbent can be added to the polymer and the solvent.

[Cooling Stage]

At the next stage, the swelled mixture is cooled to a temperature of −100 to −10° C. The swelled mixture preferably solidifies at the cooling stage.

According to the present invention, the swelled mixture is cooled at a rate of faster than 1° C. per minute.

In the first embodiment of the cooling stage, the cooling rate is in the range of 1 to 40° C. per minute, preferably in the range of 2 to 40° C. per minute, more preferably in the range of 4 to 40° C. per minute, and most preferably in the range of 8 to 40° C. per minute.

In the second embodiment of the cooling stage, the cooling rate is faster than 40° C. per minute, preferably faster than 1° C. per second, more preferably faster than 2° C. per second, further preferably faster than 4° C. per second, and most preferably faster than 8° C. per second. The cooling rate is preferably fast as possible. However, a theoretical upper limit of the cooling rate is 10,000° C. per second, a technical upper limit is 1,000° C. per second, and a practical upper limit is 100° C. per second.

The cooling rate means the change of temperature at the cooling stage per the time taken to complete the cooling stage. The change of temperature means the difference between the temperature at which the cooling stage is started and the temperature at which the cooling stage is completed.

According to the first embodiment of the cooling stage, the swelled mixture is preferably cooled by incorporating the mixture into a cylinder to which a cooling means is attached, and stirring and conveying the mixture in the cylinder. The swelled mixture can be cooled quickly according to the first embodiment.

Further, the swelled mixture can also be cooled by further mixing the mixture with a supplemental solvent precooled to a temperature of −105 to −15° C. The supplemental solvent is precooled preferably at a temperature of −100 to −25° C., more preferably at a temperature of −95 to −35° C., and most preferably at a temperature of −85 to −55° C.

The time taken to complete the cooling stage (the time taken to cool the mixture and to keep the mixture at the cooling temperature) is preferably in the range of 10 to 300 minutes, and more preferably in the range of 20 to 200 minutes.

The cylinder used in the first embodiment is preferably sealed to prevent contamination of water, which may be caused by dew condensation at the cooling stage. Further, the time taken to complete the cooling stage can be shortened by conducting the cooling procedures under a reduced pressure. A cylinder resisting pressure is preferably used to conduct the procedures under a reduced pressure.

The first embodiment of the cooling stage can be conducted in a closed system. The closed system has an advantage (compared with an open system such as the second embodiment) that amounts of components used in the system directly reflect the composition (particularly concentration) of a solution to be obtained. Accordingly, the amounts of components can be theoretically determined from the composition of the solution to be obtained. On the other hand, the amounts of components should empirically be determined from experimental results if the solution is prepared in an open system.

According to the second embodiment, the swelled mixture is cooled by extruding the mixture into a liquid precooled at a temperature of −100 to −10° C. The extruded mixture is in the form of fiber having a diameter in the range of 0.1 to 20.0 mm or in the form of membrane having a thickness in the range of 0.1 to 20.0 mm. The diameter or the thickness is preferably in the range of 0.2 to 10.0 mm. The cooling rate is inversely proportional to the square of the diameter. If the thermal conductivity of the fibrous swelled mixture is 0.2 kcal/mhr° C. and the temperature of the liquid is −50° C., the relation between the time taken to cool the center of the fiber from room temperature to −45° C. (T, second) and the diameter of the fiber (D, mm) can be represented by a formula, $T=D^2$. If the diameter is 1 mm, the cooling time is 1 second, which means the cooling rate of 70° C. per second. If the diameter is 10 mm, the cooling time is 100 second, which means the cooling rate of 42° C. per minute. The relation between the cooling time and the thickness of the membrane of the swelled mixture is the same as the relation between the cooling time and the diameter of the fiber.

The fiber or the membrane of the swelled mixture can be continuous (have an unlimited length) or can be cut into pieces having a certain length. The cross sectional profile of the fibrous mixture is determined preferably to improve efficiency of heat transfer. Accordingly, a star-like shape is preferred to a circular shape because a fiber having a star-like cross sectional profile has a large surface area, which is effective for heat transfer.

The extrusion of the swelled mixture can be conducted by applying pressure (including gravity) to the mixture placed on a board having many small holes or slits whereby the mixture passes through the holes or slits. The formed fibers or membranes are immersed in (usually dropped into) a precooled liquid.

There is no specific limitation with respect to the liquid for cooling the mixture (except that it must be in the form of liquid at the cooling temperature). The solvent contained in the mixture can also be used as the liquid. Since the second embodiment is an open system, the liquid may be incorporated into the mixture. If the solvent of the mixture is used as the liquid, the composition of the obtained polymer solution could be analogous to the composition of the mixture. Alternatively, a polymer solution can contain a liquid or a substance contained in the liquid as a minor component by incorporating the liquid or the substance into the mixture.

According to the second embodiment, the swelled solvent can be cooled in a short time, for example, in several seconds. The mixture can be held at the cooling temperature. The cooling time corresponds to the time for which the mixture passes through the precooled liquid. If the liquid flows in a vessel, the cooling time can be adjusted by controlling the flow rate.

The vessel used in the second embodiment is preferably sealed to prevent contamination of water, which may be caused by dew condensation at the cooling stage. Further, the time taken to complete the cooling stage can be shortened by conducting the cooling procedures under a reduced pressure. A vessel resisting pressure is preferably used to conduct the procedures under a reduced pressure.

[Separating Stage]

After the second embodiment of the cooling stage, the extruded mixture is preferably separated from the precooled liquid after cooling the swelled mixture and before warming the cooled mixture. The fiber or membrane of the mixture separated from the liquid can be effectively warmed at the next warming stage.

The extruded mixture usually solidifies at the cooling stage. It is easy to separate a solid fiber or membrane from a liquid. For example, a solid fiber or membrane in a liquid can be taken out in a net. A board having small holes or slits can be used in place of the net. The net or the board is made of plastic or metal that is not dissolved in a precooled liquid. The mesh of the net, the diameter of the hole or the width of the slit should be adjusted to the diameter of the fiber or the thickness of the membrane to prevent the fiber or membrane from passing through the net or the board. Further, a conveyer can separate the fiber or membrane from the liquid. The conveyer transports the fiber or membrane from a cooling device to a warming device. The conveyer can be made of a net to separate the fiber or membrane from the liquid effectively.

[Warming Stage]

The cooled mixture is warmed to a temperature of 0 to 120° C., and preferably to a temperature of 0 to 55° C. The temperature of the obtained solution after the warming stage usually is room temperature.

According to the present invention, the swelled mixture is warmed at a rate of faster than 1° C. per minute.

In the first embodiment of the warming stage, the warming rate is in the range of 1 to 40° C. per minute, preferably in the range of 2 to 40° C. per minute, more preferably in the range of 4 to 40° C. per minute, and most preferably in the range of 8 to 40° C. per minute.

In the second embodiment of the warming stage, the warming rate is faster than 40° C. per minute, preferably faster than 1° C. per second, more preferably faster than 2° C. per second, further preferably faster than 4° C. per second, and most preferably faster than 8° C. per second. The warming rate is preferably fast as possible. However, a theoretical upper limit of the warming rate is 10,000° C. per second, a technical upper limit is 1,000° C. per second, and a practical upper limit is 100° C. per second.

The warming rate means the change of temperature at the warming stage per the time taken to complete the warming stage. The change of temperature means the difference between the temperature at which the warming stage is started and the temperature at which the warming stage is completed.

According to the first embodiment of the warming stage, the cooled mixture is preferably warmed by incorporating the mixture into a cylinder to which a warming mean is attached, and stirring and conveying the mixture in the cylinder. The cooled mixture can be warmed quickly according to the first embodiment.

The time taken to complete the warming stage (the time taken to warm the mixture and to keep the mixture at the warming temperature) is preferably in the range of 10 to 300 minutes, and more preferably in the range of 20 to 200 minutes.

The time taken to complete the warming stage can be shortened by conducting the warming procedures under a high pressure. A cylinder resisting pressure is preferably used to conduct the procedures under a high pressure.

The first embodiment of the warming stage can be conducted in a closed system. The closed system has an advantage (compared with an open system such as the second embodiment), as is described about the cooling stage.

According to the second embodiment, the cooled mixture is warmed by immersing the mixture in a liquid prewarmed to a temperature of 0 to 120° C. The mixture is in the form of fiber having a diameter in the range of 0.1 to 20.0 mm or in the form of membrane having a thickness in the range of 0.1 to 20.0 mm. The diameter or the thickness is preferably in the range of 0.2 to 10.0 mm. The relation between the warming time and the diameter of the fiber or the thickness of the membrane is analogous to the relation described about the cooling stage.

If a mixture is extruded in the form of a fiber or membrane at the cooling stage by the second embodiment, the cooled fiber or membrane is immersed in a prewarmed liquid at the warming stage. If the cooling stage is conducted by procedures other than the second embodiment, a cooled mixture is extruded in the form of a fiber or membrane, and dropped into a prewarmed liquid. The mixture can be extruded in the same manner as is described about the second embodiment of the cooling stage.

There is no specific limitation with respect to the liquid for warming the mixture (except that it must be in the form of liquid at the warming temperature). The solvent contained in the mixture can also be used as the liquid. If the process is successively conducted, the prepared polymer solution can be used as the prewarmed liquid. For example, the fiber or membrane of the mixture is dropped into the prepared solution in a vessel to warm the fiber or membrane quickly and to change it into the solution, whereby the amount of the solution is increased. The increased amount of the solution is recovered from the vessel.

According to the second embodiment, the cooled mixture can be warmed in a short time, for example, in several seconds.

The time taken to complete the warming stage can be shortened by conducting the warming procedures under a reduced pressure. A vessel resisting pressure is preferably used to conduct the procedures under a reduced pressure.

After the warming stage, a polymer solution is obtained. If the polymer is not completely dissolved in the solvent, the procedures from the cooling stage to the warming stage can be repeated two or more times. It can be determined by observation whether a polymer is completely dissolved in a solvent or not.

[Post Treatment]

The prepared polymer solution can be subjected to post treatment such as adjustment of concentration (or dilution), filtration, adjustment of temperature or addition of components.

The additional components are determined according to use of the polymer solution. Examples of the representative additives include a plasticizer, a deterioration inhibitor (e.g., a peroxide decomposer, a radical inhibitor, a metal inactivator, an acid scavenger), a dye and an ultraviolet absorbent.

The obtained polymer solution should be stored at a temperature within a certain range to keep the state of the solution. For example, an acetone solution of cellulose triacetate prepared by a cooling dissolution method has two phase separation ranges within the temperature of −10 to 30° C., at which the solution is usually stored. The acetone solution of cellulose triacetate should be stored at a temperature within a uniform range between the two phase separation ranges.

The obtained polymer solution can be used to form various polymer materials.

[Preparation of Polymer Film]

A polymer film can be formed by a solvent cast method using the obtained polymer solution.

The polymer solution is cast on a support, and the solvent is evaporated to form a film. Before casting the solution, the concentration of the solution is preferably adjusted so that the solid content of the solution is in the range of 18 to 35 wt. %. The surface of the support is preferably polished to give a mirror plane. A drum or a band is used as the support. The casting and drying stages of the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

In the case that a solution of cellulose acetate is used, the support preferably has a surface temperature of not higher than 10° C. when the solution is cast on the support. After casting the solution, the solution is preferably dried with air for at least 2 seconds. The formed film is peeled off the support, and the film can be further dried with air to remove the solvent remaining in the film. The temperature of the air can be gradually elevated from 100 to 160° C. The above-mentioned method is described in Japanese Patent Publication No. 5(1993)-17844. The time for casting and peeling steps can be shortened by the method.

[Apparatus]

The apparatus of the present invention is described below referring to the drawings.

The first embodiment of the apparatus comprises a stirring device, a cooling device connected to the stirring device, and a warming device connected to the cooling device, wherein both of the cooling device and the warming device include a rotary screw.

The stirring device preferably comprises a first vessel and a stirring means contained in the first vessel. The cooling preferably comprising a second vessel (more preferably in the form of a cylinder) connected to the first vessel, a rotary screw contained in the second vessel and a cooling means attached to the second vessel. The warming device preferably comprises a third vessel (more preferably in the form of a cylinder) connected to the second vessel, a rotary screw contained in the third vessel and a warming means attached to the third vessel.

FIG. 1 is a flow chart schematically illustrating the process and apparatus of the first embodiment.

As is shown in FIG. 1, a polymer (P) and a solvent (S1) are introduced into a stirring tank (1) at the swelling stage. The polymer and the solvent are mixed in the tank to swell the polymer with the solvent.

The swelled mixture is sent to a cooling device (3) by a liquid pump (2). The liquid pump (2) preferably is a snake pump, which is advantageously used to send a viscous liquid.

The cooling device (3) comprises a cylinder connected to the stirring tank (1) through the liquid pump (2), a rotary screw (3-1) contained in the cylinder and a cooling means (3-2) attached to the cylinder. The screw (3-1) rotates in the cylinder to send the swelled mixture while shearing, mixing and cooling the mixture. The mixture cannot stay in the cylinder because the screw (3-1) scrapes the mixture from the inner wall of the cylinder. The cooling means (3-2) shown in FIG. 1 is in the form of a jacket of the cylinder. A refrigerant (24) flows in the jacket. The refrigerant is sent from a refrigerant tank (21). An example of the refrigerant is a mixture of methanol and water. In place of rotating the screw, the screw can be fixed, and the mixture can be sent through the screw in the cylinder by pressure.

After cooling the swelled mixture, the refrigerant returns to the refrigerant tank (21). The medium is cooled in a refrigerator (22). A cooling tower (23) processes heat formed in the refrigerator.

The cooling device (3) has a means for supplying a solvent precooled at −105 to −15° C. A supplemental solvent (S2) is precooled in a cooling stock tank (19) and sent to the cylinder of the cooling device (3) by a liquid pump (20). The swelled mixture is cooled more quickly by supplying the precooled solvent (S2) to the mixture.

The cooling device (3) is described below in more detail referring to FIG. 2.

The swelled mixture is quickly and uniformly cooled to −100 to −10° C. in the cooling device. The cooled mixture is sent to a warming device (4).

The warming device (4) is similar to the cooling device (3). The warming device (4) comprises a cylinder connected to the cooling device (3), a rotary screw (4-1) contained in the cylinder and a warming means (4-2) attached to the cylinder. The screw (4-1) rotates in the cylinder to send the cooled mixture while shearing, mixing and warming the mixture. The mixture cannot stay in the cylinder because the screw (4-1) scrapes the mixture from the inner wall of the cylinder. The warming means (4-2) shown in FIG. 1 is in the form of a jacket of the cylinder. A heating medium (26) flows in the warming means (4-2). The heating medium is sent from a constant temperature bath (27). An example of the heating medium is hot water. In place of rotating the screw, the screw can be fixed, and the mixture can be sent through the screw in the cylinder by pressure.

A prewarmed solvent may be supplied to the cooled mixture in the same manner as in the cooling device. However, the supplement of the prewarmed solvent is not effective. The solvent lacks thermal efficiency. Heat formed by rotation of the screw in the warming device as well as the heating medium (26) warms the cooled mixture.

After warming the cooled mixture, the heating medium and water sent from the cooling tower (23) exchange heat in a heat exchanger (25). The thermal efficiency of the apparatus is improved by the heat exchange. After the heat exchange, the heating medium returns to the constant temperature bath (27).

The cooled mixture is quickly and uniformly warmed in the warming device to dissolve a polymer in a solvent. The obtained solution is sent to a heater (6) by pump (5), a filter (7) and a pressure adjusting valve (8) in the order by a liquid pump to adjust temperature, to conduct filtration and to adjust pressure.

The solution is concentrated in a concentration tank (9). The solution, which has been conditioned to a high temperature and a high pressure by the heater (6) and the pressure adjusting valve (8) is introduced into the concentration tank (9) under a reduced pressure. Accordingly, the solvent of the solution is immediately evaporated under the reduced pressure. The evaporated solvent is sent to a liquefying device (18) and to the cooling stock tank (19). The liquefied solvent mixed with the supplemental solvent (S2) is again sent to the cylinder of the cooling device (3) by the pump (20).

The concentrated solution is sent to a thermal controller (11) and to a stock tank (12) by a liquid pump (10).

A device of the preparation of a polymer film according to a solvent casting method is further attached to the apparatus shown in FIG. 1.

The solution in the stock tank (12) is sent to a filter (14) and to a slit die (15) by a liquid pump (13). The solution is extruded by the die, and cast on a band support (16). The cast solution is dried and peeled from the support to form a film (17). The film (17) is further dried and wound up to a roll.

Figure 2:
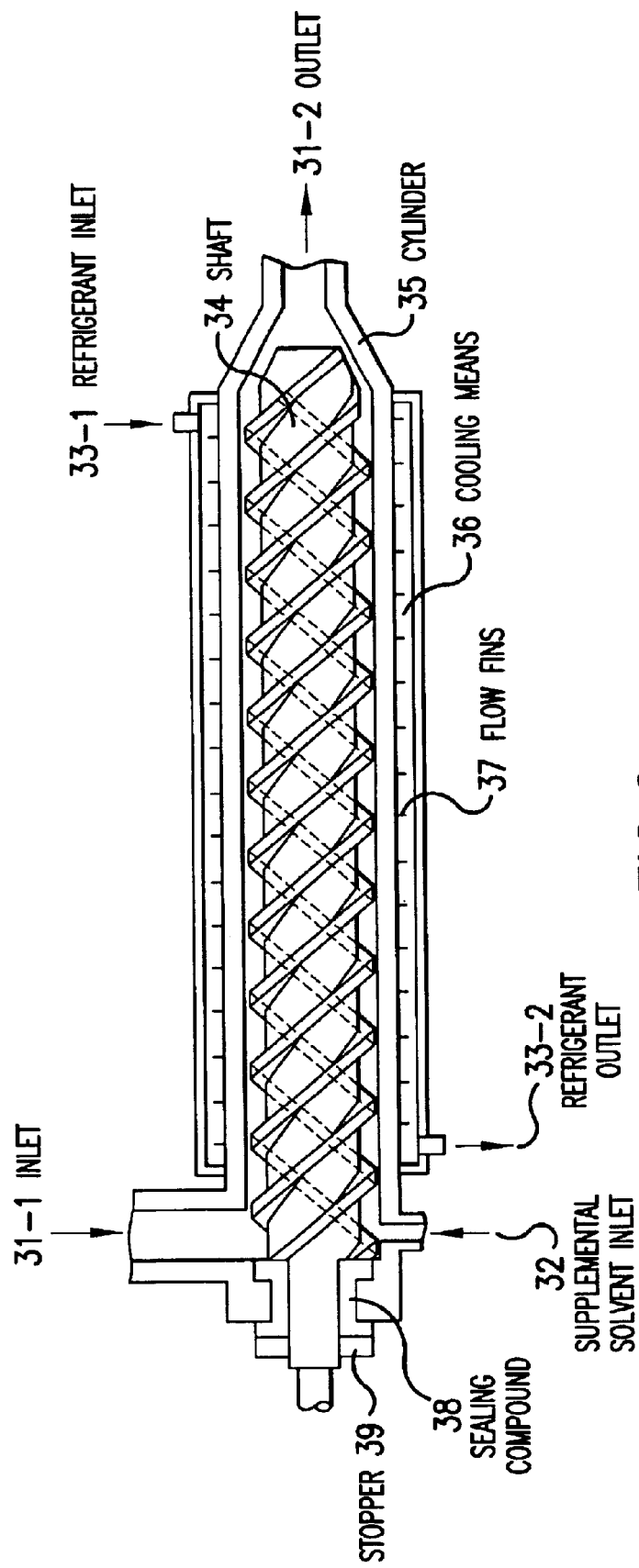
FIG. 2 is a sectional view schematically illustrating the cooling device of the first embodiment.

FIG. 2 is a sectional view schematically illustrating the cooling device (3 in FIG. 1) of the first embodiment.

A swelled mixture of a polymer and a solvent is introduced into a cylinder (35) at an inlet (31-1). A cooled mixture is sent to a warming device from an outlet (31-2).

The cylinder further has an inlet of a precooled supplemental solvent (32), an inlet (33-1) of a refrigerant and an outlet (33-2) of the refrigerant.

In the cylinder, a screw rotates around the center of a shaft (34). The screw sends the swelled mixture from the inlet (31-1) to the outlet (31-2) while shearing, mixing and cooling the mixture. The mixture cannot stay in the cylinder because the screw scrapes the mixture from the inner wall of the cylinder (35).

Spiral turbulent flow fins (37) are attached inside a cooling means (36) in the form of a jacket, in other words outside the cylinder (35). The fins have a function of improving the cooling efficiency of a refrigerant.

The screw shaft (34) is rotated by a motor (not shown) placed outside the cylinder (35). The inside of the cylinder (35) is under a high pressure. Accordingly, the connection of the cylinder (35) to the shaft (34) is sealed with a sealing compound (38) and a seal stopper (39).

The warming device (4 in FIG. 1) can be analogous to the cooling device shown in FIG. 2, except that the inlet for the supplemental solvent (32) is not necessary.

The second embodiment of the apparatus comprises a stirring device, an extrusion device connected to the stirring device, a cooling device connected to the extrusion device and warming device connected to the cooling device, wherein the extrusion device is a fiber or membrane extruding die, and both of the cooling device and the warming device mainly consist of a vessel.

The stirring device preferably comprises a first vessel and a stirring means contained in the first vessel (41). The cooling device preferably comprises a second vessel placed under the extruding device and a cooling means attached to the second vessel (58). The second embodiment preferably further comprises a separating device between the cooling device and the warming device. The separating device preferably comprises a conveyer, a part of which is placed inside of the second vessel and under the extruding device, and the other part of which is placed outside of the second vessel. The warming device preferably comprises a third vessel (45) placed under the part of the conveyer outside the second vessel and a warming means attached to the third vessel.

Figure 3:
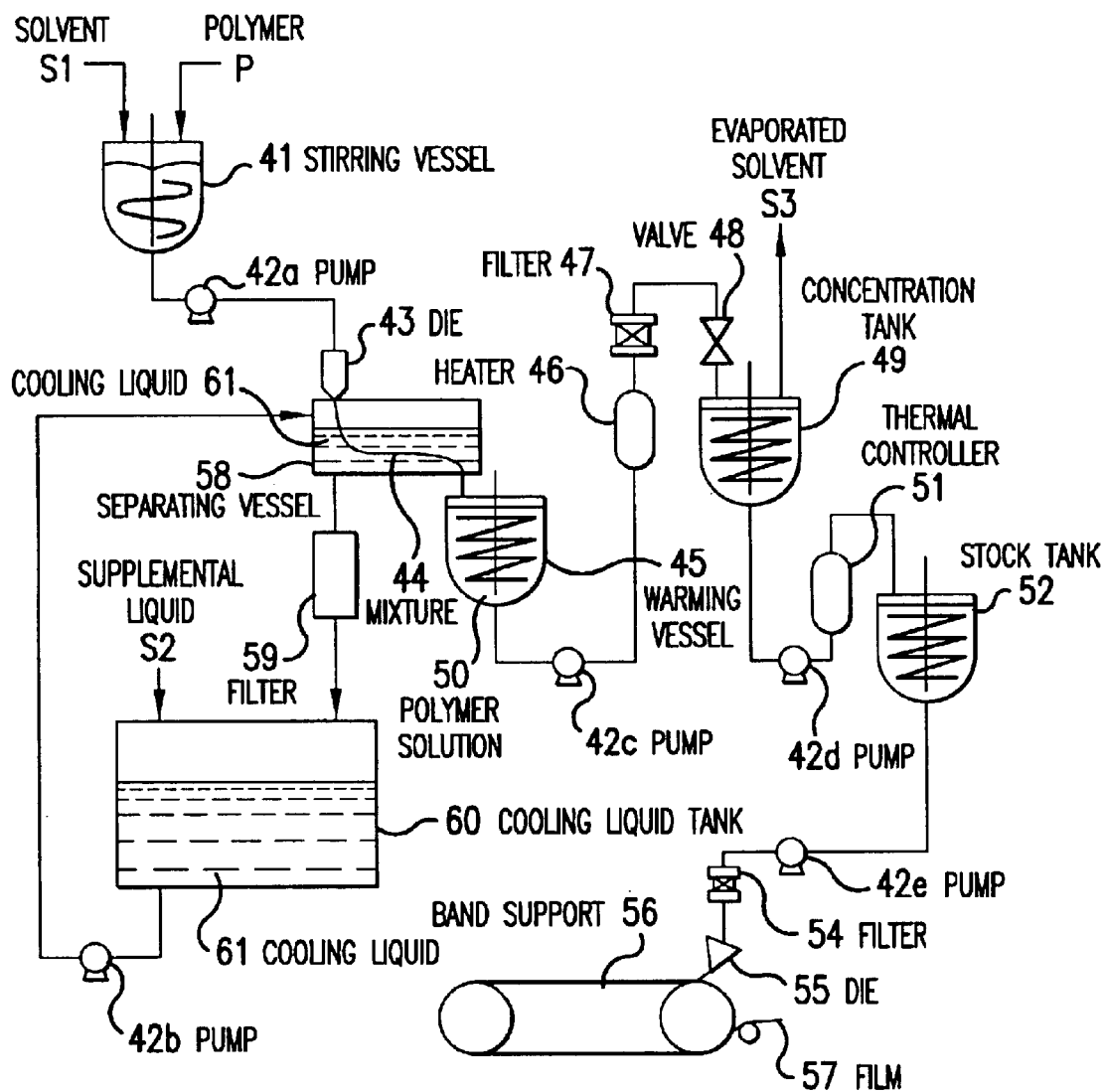
FIG. 3 is a flow chart schematically illustrating the process and apparatus of the second embodiment.

FIG. 3 is a flow chart schematically illustrating the process and apparatus of the second embodiment.

As is shown in FIG. 3, a polymer (P) and a solvent (S1) are introduced into a stirring vessel (41) at the swelling stage. The polymer and the solvent are mixed in the vessel (41) to swell the polymer with the solvent.

The swelled mixture is sent to a fiber extruding die (43) by a liquid pump (42a). The liquid pump (42a) preferably is a snake pump, which is advantageously used to send a viscous liquid.

The die (43) extrudes the swelled mixture in the form of a fiber. The fibrous swelled mixture (44) is dropped into a cooling and separating vessel (58). The dropped fiber is immediately cooled with a cooling liquid (61) in the vessel (58).

After cooling the swelled mixture, the refrigerant returns to the cooling liquid tank (60) through a filter (59). A supplemental cooling liquid (S2) is added to the returned cooling liquid (61), and the mixed cooling liquid is cooled in the cooling liquid tank (60). The cooling liquid is sent from the cooling liquid tank (60) to the cooling and separating vessel (58) by a pump (42b).

The cooled fibrous mixture (44) is separated from the cooling liquid (61) and sent to a warming vessel (45).

Means for warming and stirring the fibrous mixture (44) are attached to the warming vessel (45). The vessel (45) contains a prepared polymer solution (50) formed by warming the fibrous cooled mixture. The polymer solution (50) functions as a warming liquid. The fibrous cooled mixture dropped into the warming vessel (45) is immediately warmed with the polymer solution (50) to dissolve the polymer in the solvent.

As a result, the amount of the polymer solution in the warming vessel (45) is increased. The extra amount of the solution is sent from the warming vessel (45) to a liquid pump (42c). The solution is further sent to a heater (46), a filter (47) and a pressure adjusting valve (48) in the order to adjust temperature, to conduct filtration and to adjust pressure.

The solution is concentrated in a concentration tank (49). The solution, which has been conditioned to a high pressure by the pressure adjusting valve (48) is introduced into the concentration tank (49) under a reduced pressure. Accordingly, the solvent of the solution is immediately evaporated under the reduced pressure. The solution is further heated and stirred in the concentration tank. The evaporated solvent (S3) is recovered and reused as the solvent (S1).

The concentrated solution is sent to a thermal controller (51) and to a stock tank (52) by a liquid pump (42d).

A device of the preparation of a polymer film according to a solvent casting method is further attached to the apparatus shown in FIG. 3.

The solution in the stock tank (52) is sent to a filter (54) and to a slit die (55) by a liquid pump (42e). The solution is extruded by the die, and cast on a band support (56). The cast solution is dried and peeled from the support to form a film (57). The film (57) is further dried and wound up to a roll.

Figure 4:
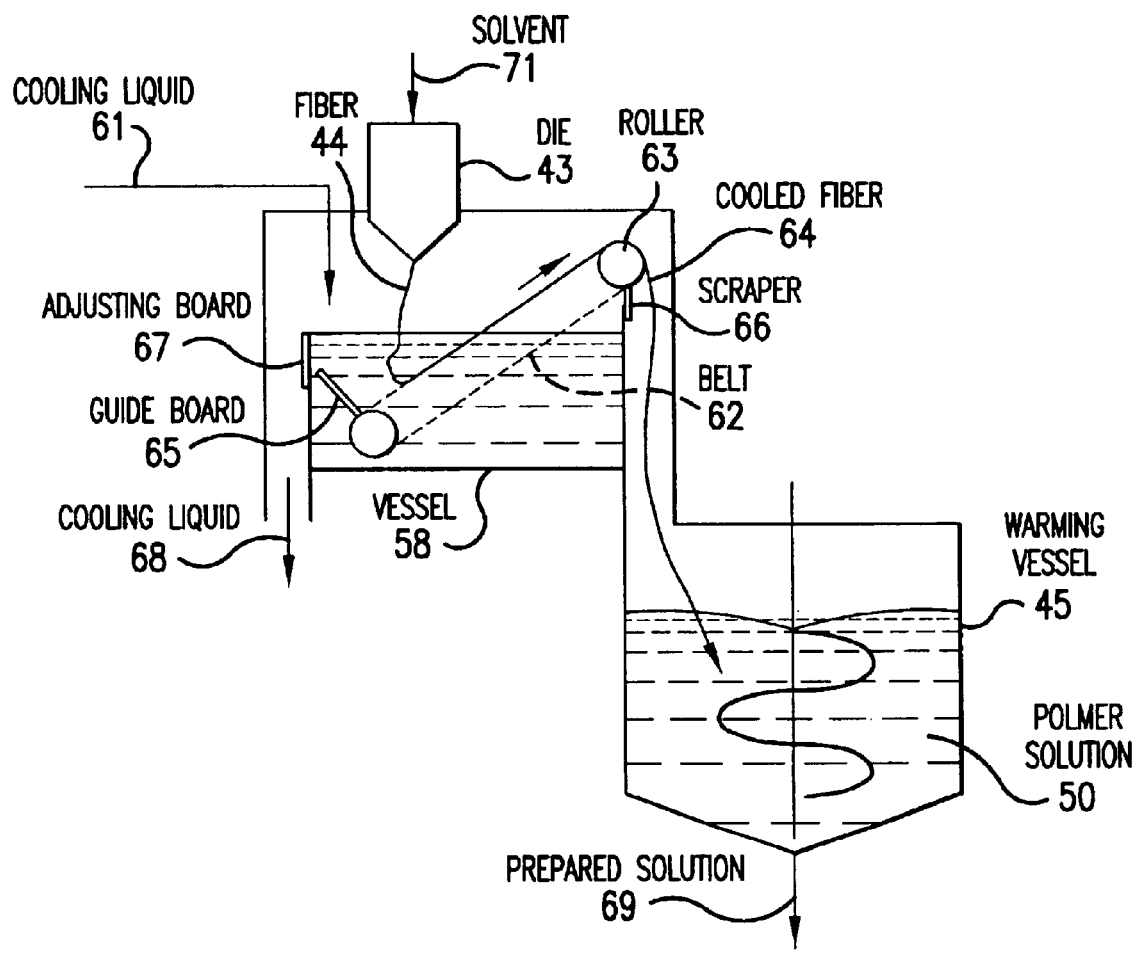
FIG. 4 is a sectional view schematically illustrating the apparatus of the second embodiment.

FIG. 4 is a sectional view schematically illustrating the apparatus of the second embodiment (3 to 5 shown in FIG. 3).

A swelled mixture of a polymer and a solvent (71) is extruded by a fiber extruding die (43). The extruded fiber (44) of the mixture is dropped into a cooling and separating vessel (58). FIGS. 3 and 4 show only one fiber (44) for convenience of description. However, it is possible and preferred to extrude many fibers simultaneously by using an extruding die.

The cooling and separating vessel (58) contains a cooling liquid (61). Further, a slanted conveyer belt made of a net (62) is placed in the cooling and separating vessel (58), except that the end of the belt is placed outside the vessel. The conveyer belt is rotated by a driving roller (63).

The dropped fiber of the mixture (44) is immediately cooled with the cooling liquid (61) in the vessel (58). The cooled fiber (64) is separated from the cooling liquid (61) while conveying the fiber on the belt (62). The separated fiber (64) is dropped into a warming vessel (45). A guide board (65) and a scraper (66) are attached to the conveyer belt (62). The board (65) guides the dropped fiber (44) to the conveyer belt (62). The scraper (66) scarps the fiber adhered to the conveyer belt (62).

An adjusting board (67) is attached to the cooling and separating vessel (58). The board (67) can adjust the liquid level in the vessel (58) to control the time for which the dropped fiber (44) is immersed in the cooling liquid (61). A cooling liquid (68) flowing over the board (67) is filtered by a filter (59 in FIG. 3) and cooled in a cooling liquid tank (60 in FIG. 3), and is reused as the cooling liquid (61).

The warming vessel (45) contains a prepared polymer solution (50). The polymer solution is warmed and stirred in the vessel (45). The cooled fiber (64) dropped into the vessel (45) is immediately warmed to dissolve the polymer in the solvent. An extra amount of the prepared solution (69) is sent from the warming vessel (45) to a liquid pump (42c in FIG. 3).

EXAMPLE 1

A solution of 26 weight parts of cellulose triacetate in 74 weight parts of acetone was prepared by using the apparatus shown in FIG. 1. At the swelling stage, 70 weight parts of acetone was used. The remaining 4 weight parts of acetone was used as a supplemental solvent at the cooling stage.

The obtained solution was observed to confirm that a transparent uniform solution was formed.

The processing conditions are shown below.

| | |
|---|---|
| Temperature at the swelling stage: | room temperature |
| Time of the swelling stage: | 30 minutes |
| Cooling rate: | 10° C. per minute |
| Temperature of supplemental solvent: | −80° C. |
| Final cooling temperature: | −75 to −65° C. |
| Time of the cooling stage: | 60 minutes |
| Warming rate: | 10° C. per minute |
| Final warming temperature: | 50° C. |
| Time of the warming stage: | 60 minutes |

COMPARISON EXAMPLE 1

A mixture of 26 weight parts of cellulose triacetate and 74 weight parts of acetone was stirred at 30° C. for 1 hour. As a result, cellulose triacetate was swelled in acetone, but was scarcely dissolved in acetone.

The swelled mixture was cooled to −70° C. by using a mixture of methanol and dry ice. The cooling rate was 0.4° C. per minute. The mixture was left for 2 hours at −70° C.

The cooled mixture was warmed to 50° C. for 5 hours while stirring the mixture. The warming rate was 0.4° C. per minute. The mixture was stirred at 50° C. for 3 hours.

As a result, most of cellulose triacetate was dissolved in acetone, however a part of cellulose triacetate was not dissolved in acetone and observed as a milky turbidity.

EXAMPLE 2

A solution of 18 weight parts of cellulose triacetate in 82 weight parts of methyl acetate was prepared by using the apparatus shown in FIG. 1. At the swelling stage, 75 weight parts of methyl acetate was used. The remaining 7 weight parts of methyl acetate was used as a supplemental solvent at the cooling stage.

The obtained solution was observed to confirm that a transparent uniform solution was formed.

The processing conditions are shown below.

| | |
|---|---|
| Temperature at the swelling stage: | room temperature |
| Time of the swelling stage: | 45 minutes |
| Cooling rate: | 12° C. per minute |
| Temperature of supplemental solvent: | −50° C. |
| Final cooling temperature: | −45 to −40° C. |
| Time of the cooling stage: | 40 minutes |
| Warming rate: | 8° C. per minute |
| Final warming temperature: | 50° C. |
| Time of the warming stage: | 50 minutes |

EXAMPLE 3

A solution of 18 weight parts of cellulose triacetate in 62 weight parts of methyl acetate and 20 weight parts of ethanol was prepared by using the apparatus shown in FIG. 1. At the swelling stage, 75 weight parts of the mixture of methyl acetate and ethanol was used. The remaining 7 weight parts of the mixture of methyl acetate and ethanol was used as a supplemental solvent at the cooling stage.

The obtained solution was observed to confirm that a transparent uniform solution was formed.

The processing conditions are shown below.

| | |
|---|---|
| Temperature at the swelling stage: | room temperature |
| Time of the swelling stage: | 60 minutes |
| Cooling rate: | 12° C. per minute |
| Temperature of supplemental solvent: | −50° C. |
| Final cooling temperature: | −55 to −45° C. |
| Time of the cooling stage: | 50 minutes |
| Warming rate: | 10° C. per minute |
| Final warming temperature: | 50° C. |
| Time of the warming stage: | 60 minutes |

EXAMPLE 4A

A solution of 28 weight parts of cellulose triacetate in 72 weight parts of acetone was prepared by using the apparatus shown in FIGS. 3 and 4.

The obtained solution was observed to confirm that a transparent uniform solution was formed.

The processing conditions are shown below.

| | |
|---|---|
| Temperature at the swelling stage: | room temperature |
| Time of the swelling stage: | 30 minutes |
| Diameter of fibrous swelled mixture: | 2 mm |
| Number of extruded fibers: | 500 |
| Extruded amount of swelled mixture: | 20 1 per minute |
| Cooling rate: | 15° C. per second |
| Temperature of cooling liquid: | −80° C. |
| Final cooling temperature: | −75 to −65° C. |
| Time of the cooling stage: | 4 seconds |
| Warming rate: | 15° C. per second |
| Final warming temperature: | 50° C. |
| Time of the warming stage: | 20 seconds |

COMPARISON EXAMPLE 2

A mixture of 28 weight parts of cellulose triacetate and 72 weight parts of acetone was stirred at 30° C. for 1 hour. As a result, cellulose triacetate was swelled in acetone, but was scarcely dissolved in acetone.

The swelled mixture was cooled to −70° C. by using a mixture of methanol and dry ice. The cooling rate was 0.4° C. per minute. The mixture was left for 2 hours at 70° C.

The cooled mixture was warmed to 50° C. for 5 hours while stirring the mixture. The warming rate was 0.4° C. per minute. The mixture was stirred at 50° C. for 3 hours.

As a result, most of cellulose triacetate was dissolved in acetone, however a part of cellulose triacetate was not dissolved in acetone and observed as a milky turbidity.

EXAMPLES 4B to 12D

The procedures of Example 4a were repeated except that the processing conditions were changed as is shown in Table 1 (4 to 12) and Table 2 (a to d) to prepare 36 (=9×4) polymer solutions including the solution of Example 4a. The conditions not shown in Tables 1 and 2 (such as the conditions at the swelling stage) are the same as the conditions in Example 4a.

The obtained solutions were observed to confirm that transparent uniform solutions were formed.

TABLE 1

| No. | %* | Composition of solvent | Weight ratio | Final cooling temperature |
|---|---|---|---|---|
| 4 | 28 | Acetone | 100 | −75 to −65° C. |
| 5 | 30 | Methyl acetate | 100 | −45 to −40° C. |
| 6 | 30 | Methyl acetate/ethanol | 80/20 | −75 to −65° C. |
| 7 | 18 | Methyl acetate/ethanol | 80/20 | −45 to −40° C. |
| 8 | 17 | MeAc/ethanol/butanol | 80/15/5 | −35 to −30° C. |
| 9 | 17 | MeAc/butanol/acetone | 75/20/5 | −35 to −30° C. |
| 10 | 17 | MeAc/EtOH/cyclohexane | 80/15/5 | −35 to −30° C. |
| 11 | 17 | MeAc/ethanol/methanol | 80/18/2 | −35 to −30° C. |
| 12 | 17 | MeAc/ethanol/propanol | 80/15/5 | −35 to −30° C. |

(Remark)
%*: Concentration of polymer solution
MeAc: Methyl acetate
EtOH: Ethanol

TABLE 2

| Sample No. | Fibers of mixture | | | Cooling stage | | Warming stage | |
|---|---|---|---|---|---|---|---|
| | Diam. | Number | Amount | Rate | Time | Rate | Time |
| a | 2 mm | 500 | 20 | 15 | 10 | 15 | 10 |
| b | 2 mm | 500 | 35 | 15 | 10 | 15 | 10 |
| c | 5 mm | 80 | 20 | 2 | 60 | 2 | 80 |
| d | 5 mm | 80 | 35 | 2 | 60 | 2 | 80 |

(Remark)
Diam.: Diameter of fibers
Amount: Extruded amount (liter per minute)
Rate: Cooling or warming rate (° C. per second)
Time: Time of cooling or warming stage (second)

It should be understood that the foregoing relates to only a preferred embodiment of the invention, and that it is intended to cover all changes and modifications of the examples of the invention herein chosen for the purposes of the disclosure, which do not constitute departures from the spirit and scope of the invention.

What is claimed is:

1. An apparatus for the preparation of a polymer solution, which comprises:
    a stirring device,
    an extrusion device connected to the stirring device, the extrusion device being a pressure-driven fiber or membrane extruding die comprising a board having many small holes or slits,
    a cooling device connected to the extrusion device, the cooling device being a vessel containing a liquid pre-cooled to a temperature of −100 to −10° C., and
    a warming device connected to the cooling device, the warming device being a vessel.

2. The apparatus as claimed in claim 1, wherein the stirring device comprises a first vessel and a stirring means contained in the first vessel.

3. The apparatus as claimed in claim 2, wherein the cooling device comprises a second vessel placed under the extruding device and a cooling means attached to the second vessel.

4. The apparatus as claimed in claim 3, wherein the apparatus further comprises a separating device between the cooling device and the warming device.

5. The apparatus as claimed in claim 4, wherein the separating device comprises a conveyer, a part of which is placed inside of the second vessel and under the extruding device, and the other part of which is placed outside of the second vessel.

6. The apparatus as claimed in claim 5, wherein the warming device comprises a third vessel placed under the part of the conveyer outside the second vessel and a warming means attached to the third vessel.

7. The apparatus as claimed in claim 4, wherein the separating device has a function of separating a cooled mixture from a precooled liquid.

8. An apparatus for the preparation of a polymer solution, which comprises:
    a stirring device;
    an extrusion device connected to the stirring device, the extrusion device being a fiber or membrane extruding die;
    a cooling device connected to the extrusion device, the cooling device being a vessel containing a liquid pre-cooled to a temperature of −100 to −10° C.;
    a warming device connected to the cooling device, the warming device being a vessel; and
    a die downstream from the warming device for extruding the polymer solution.

9. The apparatus as claimed in claim 8, wherein the stirring device comprises a first vessel and a stirring means contained in the first vessel.

10. The apparatus as claimed in claim 9, wherein the cooling device comprises a second vessel placed under the extruding device and a cooling means attached to the second vessel.

11. The apparatus as claimed in claim 10, wherein the apparatus further comprises a separating device between the cooling device and the warming device.

12. The apparatus as claimed in claim 11, wherein the separating device comprises a conveyer, a part of which is placed inside of the second vessel and under the extruding device, and the other part of which is placed outside of the second vessel.

13. The apparatus as claimed in claim 12, wherein the warming device comprises a third vessel placed under the part of the conveyer outside the second vessel and a warming means attached to the third vessel.

14. The apparatus as claimed in claim 11, wherein the separating device has a function of separating a cooled mixture from a precooled liquid.

* * * * *